United States Patent
Hattori et al.

(10) Patent No.: US 10,862,154 B2
(45) Date of Patent: Dec. 8, 2020

(54) FUEL CELL STACK

(71) Applicant: DENSO CORPORATION, Kariya (JP)

(72) Inventors: Hidekazu Hattori, Kariya (JP); Shinichi Sugihara, Kariya (JP)

(73) Assignee: DENSO CORPORATION, Kariya (JP)

( * ) Notice: Subject to any disclaimer, the term of this patent is extended or adjusted under 35 U.S.C. 154(b) by 69 days.

(21) Appl. No.: 15/878,059

(22) Filed: Jan. 23, 2018

(65) Prior Publication Data

US 2018/0219244 A1    Aug. 2, 2018

(30) Foreign Application Priority Data

Jan. 30, 2017  (JP) ................. 2017-014495

(51) Int. Cl.
| | | |
|---|---|---|
| *H01M 8/2483* | (2016.01) | |
| *H01M 8/2432* | (2016.01) | |
| *H01M 8/243*  | (2016.01) | |
| *H01M 8/00*   | (2016.01) | |
| *H01M 8/248*  | (2016.01) | |
| *H01M 8/0202* | (2016.01) | |
| *H01M 8/1246* | (2016.01) | |
| *H01M 8/124*  | (2016.01) | |

(52) U.S. Cl.
CPC ......... *H01M 8/2483* (2016.02); *H01M 8/004* (2013.01); *H01M 8/0202* (2013.01); *H01M 8/1246* (2013.01); *H01M 8/243* (2013.01); *H01M 8/248* (2013.01); *H01M 8/2432* (2016.02); *H01M 2008/1293* (2013.01)

(58) Field of Classification Search
CPC .. H01M 8/0271; H01M 8/243; H01M 8/2483; H01M 8/2432; H01M 8/248
See application file for complete search history.

(56) References Cited

U.S. PATENT DOCUMENTS

| | | | | |
|---|---|---|---|---|
| 5,064,734 A | * | 11/1991 | Nazmy | H01M 8/0206 429/465 |
| 5,273,837 A | * | 12/1993 | Aitken | H01M 8/0271 429/496 |
| 6,492,053 B1 | * | 12/2002 | Donelson | H01M 8/242 429/458 |
| 2003/0113609 A1 | * | 6/2003 | Batfalsky | H01M 8/0206 429/468 |
| 2006/0216568 A1 | * | 9/2006 | Kohno | H01M 8/242 429/456 |
| 2007/0111055 A1 | * | 5/2007 | Katikaneni | B01J 35/026 429/423 |
| 2007/0190391 A1 | * | 8/2007 | Otschik | H01M 8/0236 429/456 |

(Continued)

FOREIGN PATENT DOCUMENTS

JP    2014-038732 A    2/2014

*Primary Examiner* — Matthew J Merkling
(74) *Attorney, Agent, or Firm* — Oliff PLC (57) ABSTRACT

A fuel cell stack includes a fuel cell, a first gas flow path, a second gas flow path, a pressing member, and a cell supporting member. The first gas flow path is provided on a first cell surface side of the fuel cell. The second gas flow path is provided on a second cell surface side of the fuel cell. The pressing member is disposed in the first gas flow path, and presses the first cell surface of the fuel cell. The cell supporting member is disposed in the second gas flow path, and supports the second cell surface of the fuel cell that is pressed by the pressing member.

15 Claims, 8 Drawing Sheets

(56) References Cited

U.S. PATENT DOCUMENTS

| | | | |
|---|---|---|---|
| 2008/0124625 A1* | 5/2008 | Hock | H01M 2/0242 429/176 |
| 2009/0023034 A1* | 1/2009 | Kusakabe | H01M 8/248 429/413 |
| 2009/0226786 A1* | 9/2009 | Selcuk | H01M 8/2483 429/454 |
| 2009/0305104 A1* | 12/2009 | Matsumoto | H01M 8/242 429/434 |
| 2010/0055531 A1 | 3/2010 | Ohmori et al. | |
| 2014/0170522 A1 | 6/2014 | Hotta et al. | |
| 2015/0056537 A1* | 2/2015 | Yagi | H01M 8/0232 429/495 |
| 2015/0221966 A1* | 8/2015 | Kawahara | H01M 8/04552 429/452 |
| 2018/0155193 A1* | 6/2018 | Sakai | H01M 8/0232 |

* cited by examiner

FUEL CELL STACK

CROSS-REFERENCE TO RELATED APPLICATION

This application is based on and claims the benefit of priority from Japanese Patent Application No. 2017-014495, filed Jan. 30, 2017. The entire disclosure of the above application is incorporated herein by reference.

BACKGROUND

Technical Field

The present disclosure relates to a fuel cell stack.

Related Art

Conventionally, as described in JP-A-2013-55042, for example, a fuel cell stack that includes a pair of interconnectors, a fuel cell, and current collectors is known. The fuel cell is positioned between the pair of interconnectors. The current collectors are respectively disposed in gas flow paths that are provided between an anode of the fuel cell and the interconnector, and between a cathode of the fuel cell and the interconnector.

The conventional technology has the following issues. In many cases, the current collector also serves to absorb tolerance, difference in thermal expansion, and the like of constituent battery components that occur during formation of a fuel cell stack that is an assembly of a plurality of fuel cells. However, when the fuel cell stack is merely structured such that the fuel cell is sandwiched between the current collectors, a fixing position of the fuel cell is not fixed due to differences in rigidity and variations in strength among the current collectors, the tolerance of constituent battery components, and the like. The dimensions of the gas flow paths within the fuel cell stack vary. As a result, distribution of gas flow of a fuel gas or an oxidant gas to each fuel cell varies. Battery performance and battery reliability are adversely affected.

SUMMARY

It is thus desired to provide a fuel cell stack that is capable of suppressing dimensional variations in gas flow paths.

An exemplary embodiment of the present disclosure provides a fuel cell stack that includes: a fuel cell; a first gas flow path that is provided on a first cell surface side of the fuel cell; a second gas flow path that is provided on a second cell surface side of the fuel cell; a pressing member that is disposed in the first gas flow path and presses the first cell surface of the fuel cell; and a cell supporting member that is disposed in the second gas flow path and supports the second cell surface of the fuel cell that is pressed by the pressing member.

Therefore, in the fuel cell stack, the fuel cell is fixed in a state in which the fuel cell is pressed against the cell supporting member by the pressing force from the pressing member. That is, in the fuel cell stack, the direction in which the fuel cell is pressed is a direction from the first cell surface side to the second cell surface side of the fuel cell. Therefore, as a result of the structure of the fuel cell stack, a fixing position of the fuel cell is fixed between: the first gas flow path provided on the first cell surface side of the fuel cell; and the second gas flow path provided on the second cell surface side of the fuel cell. Dimensional variations in the first gas flow path and the second gas flow path can be suppressed. Consequently, as a result of the structure of the fuel cell stack, distribution of gas flow of a fuel gas or an oxidant gas to the fuel cell can be more easily stabilized. The fuel cell stack is advantageous in terms of improving battery performance and battery reliability.

Reference numbers within the parentheses in the claims indicate corresponding relationships with specific means according to embodiments described hereafter as aspects, and do not limit the technical scope of the present disclosure

DESCRIPTION OF THE EMBODIMENTS

First Embodiment

A fuel cell stack according to a first embodiment will be described with reference to FIGS. 1 and 2. As shown as an example in FIGS. 1 and 2, a fuel cell stack 1 according to the present embodiment includes a fuel cell 2, a first gas flow path 3C and a second gas flow path 3A, a pressing member 4, and a cell supporting member 5. The first gas flow path 3C and the second gas flow path 3A are respectively provided on one surface side and another surface side of the fuel cell 2. The pressing member 4 is disposed in the first gas flow path 3C and presses one cell surface (first cell surface) of the fuel cell 2. The cell supporting member 5 is disposed in the second gas flow path 3A, and supports the other cell surface (second cell surface) of the fuel cell 2 that is pressed by the pressing member 4. The fuel cell stack 1 will be described below.

The fuel cell 2 is a solid electrolyte-type fuel cell that has a solid electrolyte layer 21. A solid oxide ceramic or the like that exhibits oxygen ion conductivity may be used as the solid electrolyte that composes the solid electrolyte layer. A fuel cell in which a solid oxide ceramic is used as the solid electrolyte is referred to as a solid oxide fuel cell (SOFC).

Figure 1:
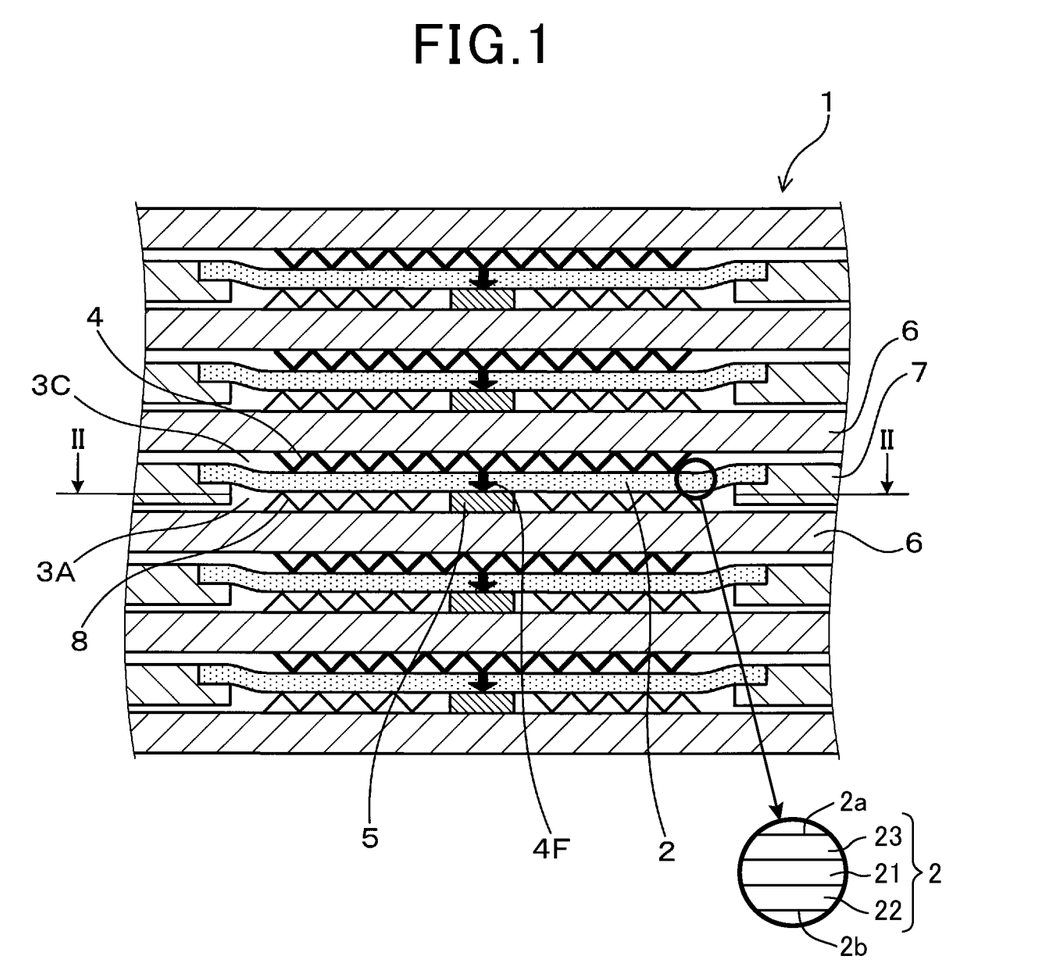
FIG. 1 is a schematic cross-sectional view of a fuel cell stack according to a first embodiment, taken along a cell stacking direction.
Figure 2:
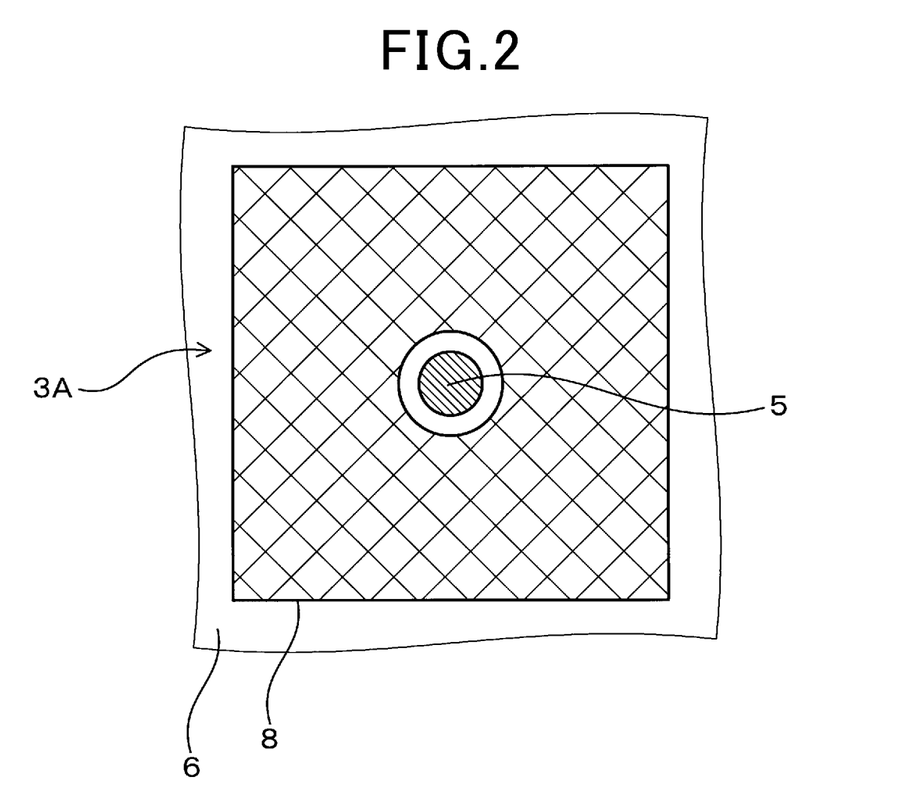
FIG. 2 is a cross-sectional view taken along line II-II in FIG. 1.

FIG. 1 shows an example in which the fuel cell 2 has a flat plate-shaped battery structure. Both end portions of the fuel cell 2 in FIG. 1 are shown to be bent for the purpose of schematically showing that a pressing force 4F is intentionally applied to the fuel cell 2 from the first gas flow path 3C side on which the pressing member 4 is disposed, to the second gas flow path 3A side on which the cell supporting member 5 is disposed.

Specifically, the fuel cell 2 includes the solid electrolyte layer 21, an anode 22, and a cathode 23. In addition, for example, the fuel cell 2 may also include an intermediate layer between the solid electrolyte layer 21 and the cathode 23. A detailed configuration of the fuel cell 2 is omitted in FIG. 1. Furthermore, according to the present embodiment, in FIG. 1, the anode 22 is arranged on a bottom surface 2b side of the fuel cell 2. The cathode 23 is arranged on a top surface 2a side of the fuel cell 2. The top surface 2a (hereinafter referred to as a first cell surface) corresponds to one of a pair of cell surfaces of the fuel cell 2. The bottom surface 2b (hereinafter referred to as a second cell surface) corresponds to the other of the pair of cell surfaces of the fuel cell 2. Materials, configurations, and the like that are publicly known may be applied to the components of the fuel cell 2. In addition, an outer peripheral edge of the fuel cell 2 may be supported by a metal frame 7. These characteristics similarly apply to second to fourth embodiments, described hereafter.

According to the present embodiment, the fuel cell stack 1 specifically includes a plurality of fuel cells 2 and a plurality of interconnectors 6. The fuel cell stack 1 has an assembled structure in which the fuel cells 2 and the interconnectors 6 are arranged in an alternating manner. The interconnectors 6 electrically connect the fuel cells 2 to one another. According to the present embodiment, the interconnector 6 also serves to separate gas that flows through the first gas flow path 3C and gas that flows through the second gas flow path 3A of adjacent fuel cells 2.

The second gas flow path 3A that is provided between the anode of the fuel cell 2 and the interconnector 6 supplies a fuel gas to the anode 22. Meanwhile, the first gas flow path 3C that is provided between the cathode of the fuel cell 2 and the interconnector 6 supplies an oxidant gas (oxidizer gas) to the cathode 23. For example, a fuel gas that is formed by reforming methane gas may be used as the fuel gas supplied to the anode 22. In addition, specifically, for example, air may be used as the oxidant gas supplied to the cathode 23. According to the present embodiment, for example, the material of the interconnector 6 may include a metal (hereafter, metal also includes alloys) such as stainless steel, a heat-resistant chromium alloy, or the like.

According to the present embodiment, the pressing member 4 may be an elastic member that presses the first cell surface 2a of the fuel cell 2 with elastic force. As a result of this configuration, the fuel cell 2 may be fixed in a state in which the fuel cell 2 is pressed against the cell supporting member 5 by the elastic force from the elastic member.

According to the present embodiment, as shown in FIG. 1, an example in which the pressing member 4 is disposed in the first gas flow path 3C on the cathode 23 side is given. Therefore, the pressing member 4 presses the first cell surface 2a on the cathode 23 side. In addition, as shown in FIG. 1, the cell supporting member 5 is disposed in the second gas flow path 3A on the anode 22 side. Therefore, the cell supporting member 5 supports the second cell surface 2b on the anode 22 side.

The pressing member 4 may be electrically conductive. Alternatively, the pressing member 4 may not be electrically conductive. As a result of the former configuration, the pressing member 4 may also function as a current collector. Therefore, a current collector is not required to be separately provided in the first gas flow path 3C in which the pressing member 4 is disposed. The former configuration is advantageous in terms of simplifying the battery structure.

FIG. 1 shows an example in which the pressing member 4 is configured by a current collector. In addition, the pressing member 4 is in contact with the cell surface that faces the first gas flow path 3C in which the pressing member 4 is disposed and contributes to power generation of the fuel cell 2. The pressing member 4 is also in contact with the interconnector 6. In cases in which the pressing member 4 is not electrically conductive, a current collector may be separately disposed in the first gas flow path 3C in which the pressing member 4 is disposed.

For example, the pressing member 4 may include a metal, such as stainless steel or a heat-resistant chromium alloy. In addition, the pressing member 4 may be configured by a mesh member, a spring member, or the like. In cases in which the pressing member 4 is configured by a metal mesh member, advantages such as excellent pressing force, current collection, and balance of gas diffusion can be obtained.

According to the present embodiment, the cell supporting member 5 may be configured to support at least a maximum deformation portion of the fuel cell 2. The maximum deformation portion is a portion of the fuel cell 2 in which an amount of deformation caused by pressing by the pressing member 4 is maximum. As a result of this configuration, the fixing position of the fuel cell 2 can be more easily stabilized. The fuel cell stack 1 in which dimensional variations in the first gas flow path 3C and the second gas flow path 3A are more easily suppressed can be obtained.

According to the present embodiment, a center portion in the cell surface of the fuel cell 2 is the maximum deformation portion. Therefore, according to the present embodiment, as shown in FIG. 2, the cell supporting member 5 is arranged such as to support the center portion of the cell surface. FIG. 2 shows an example in which the cell supporting member 5 is formed into a circular columnar shape. In addition, the shape of the cell supporting member 5 may be a polygonal columnar shape, a circular cylindrical shape, a polygonal cylindrical shape, or the like. That is, the shape of the cell supporting member 5 is not particularly limited. Furthermore, the cell supporting member 5 may also be disposed in a portion other than the maximum deformation portion.

The cell supporting member 5 may include a material that does not easily become deformed in shape as a result of the pressing force 4F. According to the present embodiment, specifically, the cell supporting member 5 may include a metal material. As a result of this configuration, electricity can be sent through the cell supporting member 5. Therefore, the cell supporting member 5 can function as a current collector. Consequently, as a result of this configuration, the fuel cell stack 1 that is advantageous in terms of improving current collection can be obtained.

According to the present embodiment, a current collector 8 is disposed in an outer periphery of the cell supporting member 5, in the second gas flow path 3A in which the cell supporting member 5 is disposed. The current collector 8 is in contact with the second cell surface 2b that faces the second gas flow path 3A in which the cell supporting member 5 is disposed and contributes to power generation of the fuel cell 2. The current collector 8 is also in contact with the interconnector 6.

According to the present embodiment, the cell supporting member 5 may be configured by a member that is separate from the interconnector 6. As a result of this configuration, the interconnector 6 and the cell supporting member 5 can be separately prepared. Therefore, the rigidity of the cell supporting member 5 can be more easily selected. Consequently, the fuel cell stack 1 in which suppression of dimensional variations in the first gas flow path 3C and the second gas flow path 3A is facilitated can be obtained. Furthermore, as a result of this configuration, the degree of freedom in selection of the shape of the cell supporting member 5 also increases. Therefore, the fuel cell stack 1 that has favorable manufacturability can be obtained.

The cell supporting member 5 may be joined to the interconnector 6. Alternatively, the cell supporting member 5 may not be joined to the interconnector 6. According to the present embodiment, the cell supporting member 5 that is configured by a member that is separate from the interconnector 6 is joined to and integrated with the interconnector 6. In cases in which the cell supporting member 6 is joined to the interconnector 6, the cell supporting member 5 does not easily detach from the interconnector 5 during assembly of the fuel cell stack 1. The cell supporting member 5 remains positioned at a predetermined target position. Therefore, in this case, the fuel cell stack 1 that has favorable manufacturability and is capable of ensuring the effect of suppressing dimensional variations in the first gas flow path 3C and the second gas flow path 3A can be obtained.

According to the present embodiment, the fuel cell stack 1 may be configured to satisfy a relationship in which the rigidity of the fuel cell 2 is less than the rigidity of the pressing member 4 and the rigidity of the pressing member 4 is less than the rigidity of the cell supporting member 5. As a result of this configuration, the direction in which the fuel cell 2 is pressed can be more easily set to the direction from the first cell surface 2a side to the second surface 2b side of the fuel cell 2. Therefore, as a result of this configuration, pressing of the fuel cell 2 against the cell supporting member 5 can be ensured. Consequently, as a result of this configuration, the fuel cell stack 1 that more easily ensures the effect of suppressing dimensional variations in the first gas flow path 3C and the second gas flow path 3A can be obtained.

The rigidity of the fuel cell 2, the rigidity of the pressing member 4, and the rigidity of the cell supporting member 5 can be ascertained through determination of load displacement characteristics of each member when compression load is applied at a temperature range in which each member is used, that is, for example, from room temperature to 900° C., and comparison of the determined load displacement characteristics. In addition, the rigidity of each member can be changed by the material, shape, and the like of each member being changed.

The fuel cell stack 1 has the configuration described above. Therefore, in the fuel cell stack 1, the fuel cell 2 is fixed in a state in which the fuel cell 2 is pressed against the cell supporting member 5 by the pressing force from the pressing member 4. That is, in the fuel cell stack 1, the direction in which the fuel cell 2 is pressed is the direction from the first cell surface 2a side to the second cell surface 2b side of the fuel cell 2. Therefore, as a result of the structure of the fuel cell stack 1, the fixing position of the fuel cell 2 is fixed between the first gas flow path 3C and the second gas flow path 3A that are respectively provided on the first cell surface 2a side and the second cell surface 2b side of the fuel cell 2. Dimensional variations in the first gas flow path 3C and the second gas flow path 3A can be suppressed. Consequently, as a result of the structure of the fuel cell stack 1, the distribution of gas flow of the fuel gas or the oxidant gas to each fuel cell 2 can be more easily stabilized. The fuel cell stack 1 is advantageous in terms of improving battery performance and battery reliability.

Second Embodiment

A fuel cell stack according to a second embodiment will be described with reference to FIGS. 3 and 4. Reference numbers used in the second and subsequent embodiments that are identical to the reference numbers used in the above-described embodiment denote constituent elements and the like that are similar to those according to the above-described embodiment, unless otherwise noted.

Figure 3:
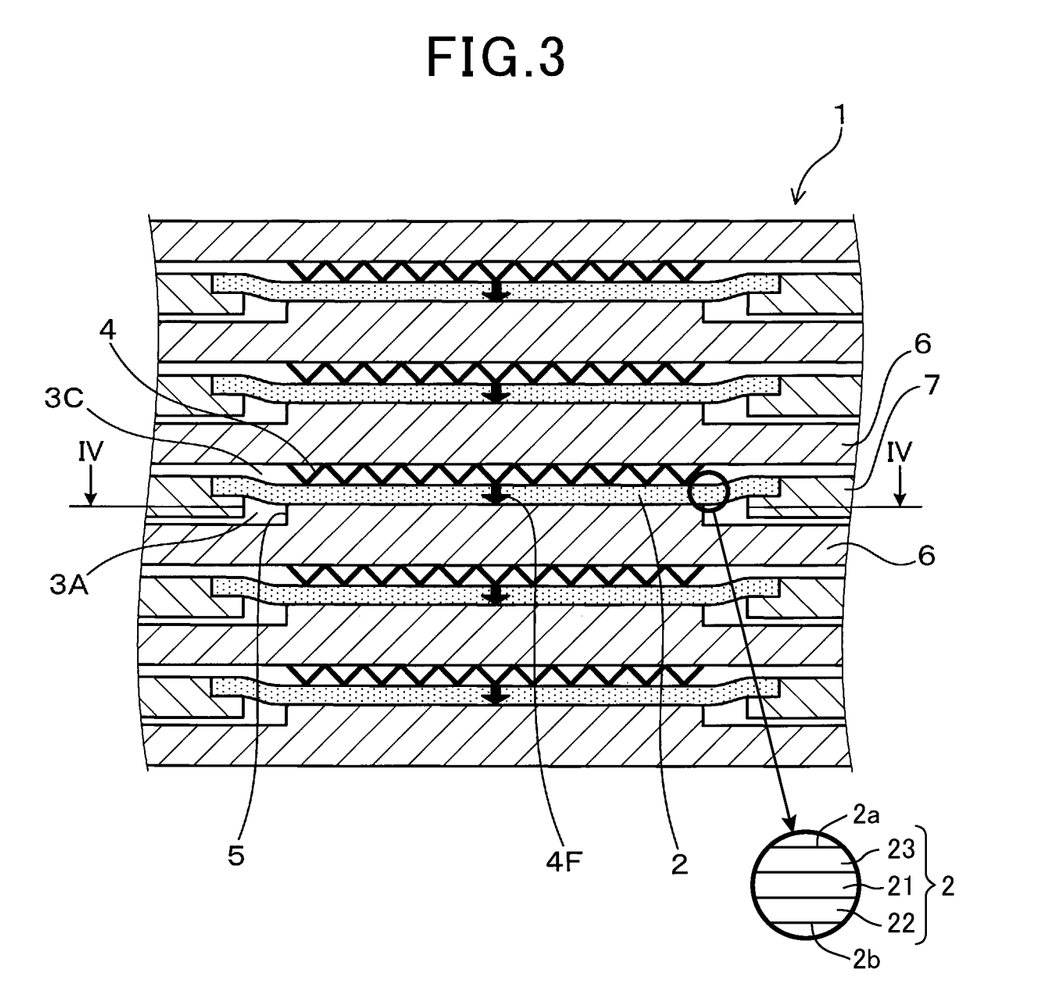
FIG. 3 is a schematic cross-sectional view of a fuel cell stack according to a second embodiment, taken along a cell stacking direction.
Figure 4:
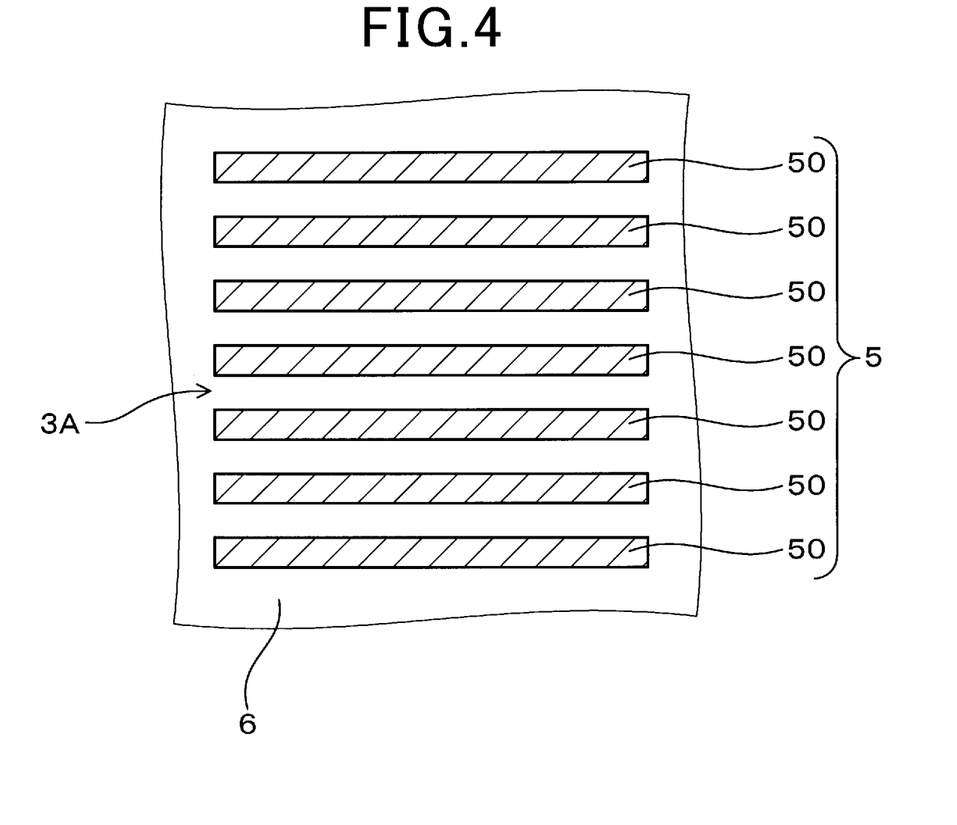
FIG. 4 is a cross-sectional view taken along line IV-IV in FIG. 3.

As show in FIGS. 3 and 4, the fuel cell stack 1 according to the present embodiment differs from that according to the first embodiment regarding the configuration of the cell supporting member 5. Other configurations are similar to those according to the first embodiment.

According to the present embodiment, the cell supporting member 5 is configured by a plurality of linear portions 50 that are separated from each other. The cell supporting member 5 supports the overall surface of the second cell surface 2b. As a result of this configuration, because the cell supporting member 5 supports the overall surface of the second cell surface 2b, the fixing position of the fuel cell 2 that is pressed against the cell supporting member 5 by the pressing member 4 can be still more easily stabilized. The fuel cell stack 1 in which dimensional variations in the first gas flow path 3C and the second gas flow path 3A are still more easily suppressed can be obtained.

In addition, the cell supporting member 5 is a portion of the interconnector 6. As a result of this configuration, the interconnector 6 and the cell supporting member 5 are not required to be separately prepared. In addition, as a result of this configuration, because the cell supporting member 5 is integrated with the interconnector 6 from the start, the cell supporting member 5 does not detach from the interconnector 6 during assembly of the fuel cell stack 1. The cell supporting member 5 remains positioned at the predetermined target position. Consequently, as a result of this configuration, the fuel cell stack 1 that has favorable manufacturability and is capable of ensuring the effect of suppressing dimensional variations in the first gas flow path 3C and the second gas flow path 3A can be obtained. Other working effects are similar to those according to the first embodiment.

Third Embodiment

A fuel cell stack according to a third embodiment will be described with reference to FIGS. 5 and 6.

Figure 5:
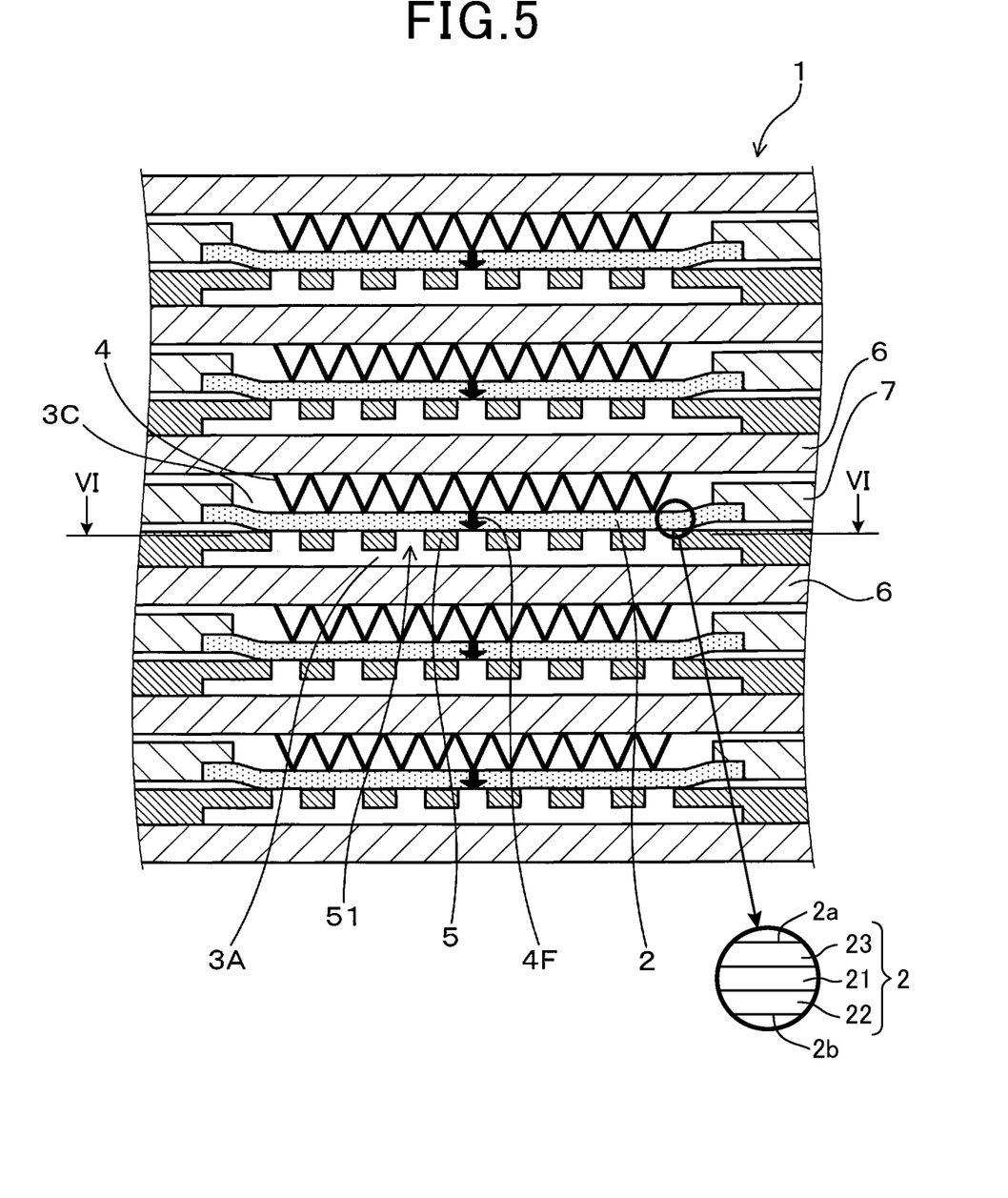
FIG. 5 is a schematic cross-sectional view of a fuel cell stack according to a third embodiment, taken along a cell stacking direction.
Figure 6:
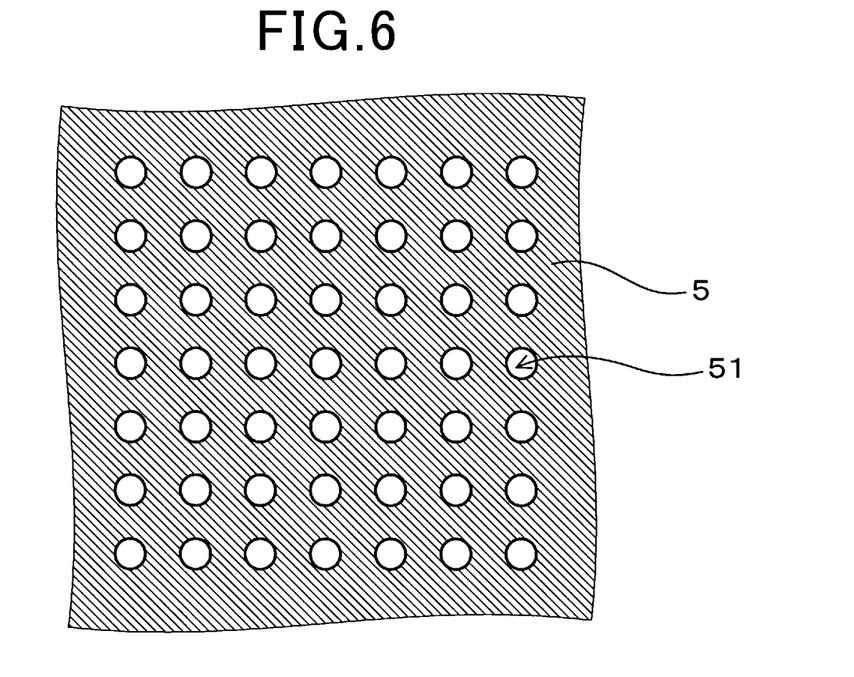
FIG. 6 is a cross-sectional view taken along line VI-VI in FIG. 5.

As shown as an example in FIGS. 5 and 6, the fuel cell stack 1 according to the present embodiment differs from that according to the first embodiment regarding the configuration of the cell supporting member 5. Other configurations are similar to those according to the first embodiment.

According to the present embodiment, the cell supporting member 5 is configured by a planar member that has a plurality of through holes 51. The through holes 51 communicate to the second gas flow path 3A. The gas (fuel gas, according to the present embodiment) that flows through the second gas flow path 3A is supplied to the fuel cell 2 via the through holes 51. The cell supporting member 5 supports the overall surface of the second cell surface 2b. As a result of this configuration, because the cell supporting member 5 supports the overall surface of the second cell surface 2b, the fixing position of the fuel cell 2 that is pressed against the cell supporting member 5 by the pressing member 4 can be still more easily stabilized. A fuel cell stack 1 in which dimensional variations in the first gas flow path 3C and the second gas flow path 3A are still more easily suppressed can be obtained. Other working effects are similar to those according to the first embodiment.

Fourth Embodiment

A fuel cell stack according to a fourth embodiment will be described.

The fuel cell stack 1 according to the present embodiment differs from that according to the first embodiment regarding the material of the cell supporting member 5. Other configurations are similar to those according to the first embodiment.

The cell supporting member 5 includes a ceramic material. As a result of this configuration, the cell supporting member 5 does not easily degrade, even when exposed to high-temperature gas inside the gas flow path 3A. Consequently, as a result of this configuration, the fuel cell stack 1 in which the effect of suppressing dimensional variations in the first gas flow path 3C and the second gas flow path 3A can be more easily obtained over a long period of time can be obtained. Other working effects are similar to those according to the first embodiment.

Fifth Embodiment

A fuel cell stack according to a fifth embodiment will be described with reference to FIG. 7.

Figure 7:
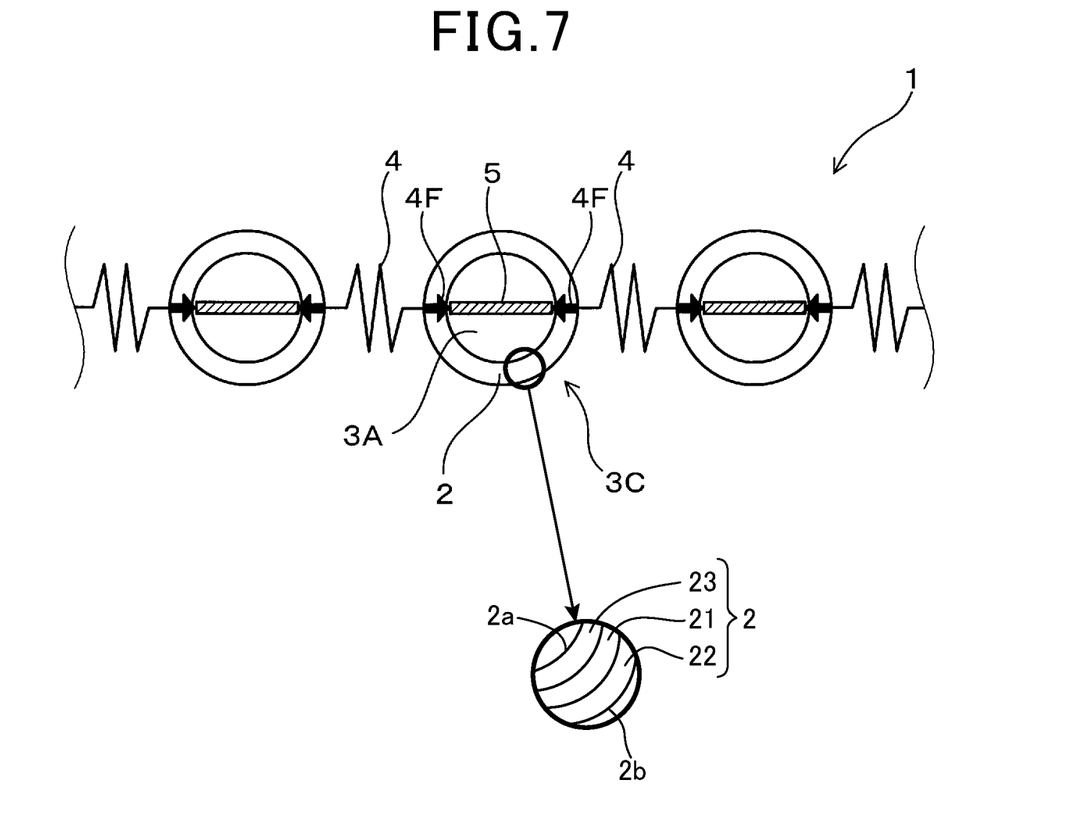
FIG. 7 is a schematic explanatory diagram of a fuel cell stack according to a fifth embodiment, viewed from above.

As shown as an example in FIG. 7, the fuel cell stack 1 according to the present embodiment is an example in which the battery structure of the fuel cell 2 (including the solid electrolyte layer 21, the anode 22, and the cathode 23) is a circular cylinder. In FIG. 7, a detailed configuration of the fuel cell 2 is omitted. According to the present embodiment, the anode 22 is arranged on an inner peripheral surface (corresponding to the second cell surface 2b) side of the fuel cell 2 in FIG. 7. The cathode 23 is arranged on an outer peripheral surface (corresponding to the first cell surface 2a) side of the fuel cell 2. Therefore, the interior of the cylinder of the fuel cell 2 serves as the second gas flow path 3A through which the fuel gas flows. In addition, the exterior of the cylinder of the fuel cell 2 serves as the first gas flow path 3C through which the oxidant gas flows. FIG. 7 shows an example in which the plurality of fuel cells 2 are arranged in a single direction in a state in which the fuel cells 2 are separated from one another.

In the fuel cell stack 1, the pressing members 4 are disposed in the first gas flow path 3C. Specifically, each pressing member 4 is disposed between two adjacent fuel cells 2. A single pressing member 4 simultaneously presses the outer peripheral cell surfaces (i.e., the first cell surfaces 2a) of the adjacent fuel cells 2. More specifically, the pressing member is configured by a mesh member that includes a metal, such as stainless steel.

In addition, in the fuel cell stack 1, the cell supporting member 5 is disposed in the gas flow path 3A. Specifically, the cell supporting member 5 supports the inner peripheral surface (i.e., the second cell surface 2b) of the fuel cell 2 that is pressed by the pressing member 4. In the fuel cell stack 1, the direction of the pressing force 4F that presses against the fuel cell 2 is the direction from the first cell surface 2a (outer peripheral surface) side to the second cell surface 2b (inner peripheral surface) side of the fuel cell 2. More specifically, for example, the cell supporting member 5 is configured by a plate-shaped member that includes metal, such as stainless steel or nickel. According to the present embodiment, the pressing member 4 has electrical conductivity and serves as the interconnector. Other configurations are basically similar to those according to the first embodiment.

Dimensional variations in the first gas flow path 3C and the second gas flow path 3A can be suppressed as a result of the structure of the fuel cell stack 1 according to the present embodiment, as well.

Sixth Embodiment

A fuel cell stack according to a sixth embodiment will be described with reference to FIG. 8.

Figure 8:
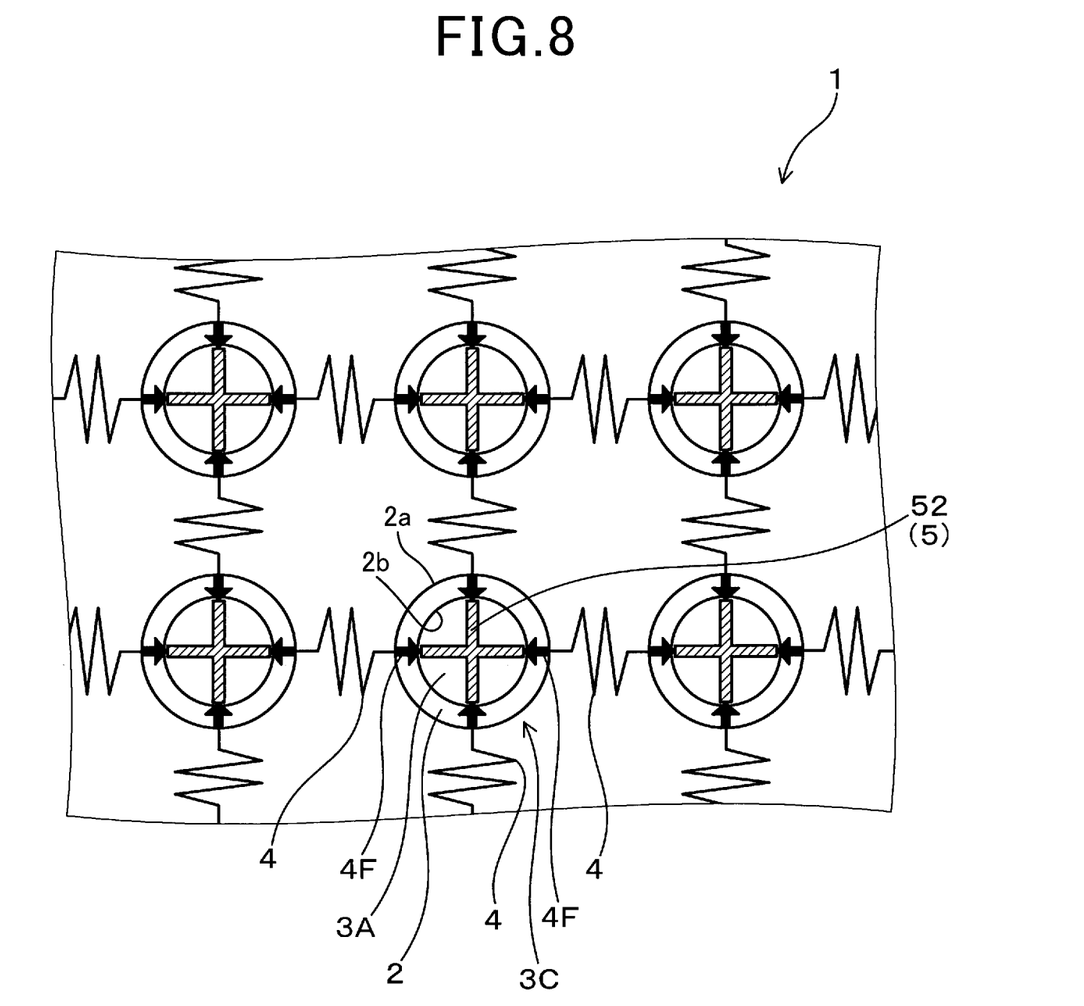
FIG. 8 is a schematic explanatory diagram of a fuel cell stack according to a fifth embodiment, viewed from above.

As shown as an example in FIG. 8, a following example of the fuel cell stack 1 according to the present embodiment is given. That is, in the fuel cell stack 1, the plurality of fuel cells 2 are arranged in a row direction and a column direction, in a state in which the fuel cells 2 are separated from another. In the fuel cell stack 1, more specifically, the cell supporting member 5 has a plurality of plate-shaped portions 52 that project from a center portion of a cell cylinder towards the outer radial direction of the cell cylinder. FIG. 8 shows an example in which the plate-shaped portions 52 are arranged in four directions, at 0°, 90°, 180°, and 270° around the axis of the cell cylinder. Other configurations are similar to those according to the fifth embodiment.

Dimensional variations in the first gas flow path 3C and the second gas flow path 3A can be suppressed as a result of the structure of the fuel cell stack 1 according to the present embodiment, as well.

EXPERIMENTAL EXAMPLES

As shown in FIG. 1, a cell supporting member that has a circular columnar shape was welded onto an interconnector that is configured by a 150-millimeter-square, stainless steel plate having a thickness of 1 millimeter. The cell supporting member includes the same material as the interconnector. In addition, as shown in FIG. 1, a pressing member that is configured by a stainless steel mesh member was assembled, as a current collector, to a surface of the interconnector on the side opposite the cell supporting member side. Furthermore, a current collector that is configured by a nickel mesh member was assembled to the surface of the interconnector on the cell supporting member side. An interconnector subassembly was thereby fabricated.

Next, a cell subassembly in which an outer peripheral edge of the fuel cell is supported by a metal frame was fabricated. A solid oxide fuel cell was used as the fuel cell.

In the fabrication of the interconnector subassembly and the cell subassembly, described above, the materials and shapes of the members were selected such that the relationship in which the rigidity of the fuel cell is less than the rigidity of the pressing member and the rigidity of the pressing member is less than the rigidity of the cell supporting member is satisfied in a temperature range from room temperature to 900° C.

Next, a fuel cell stack of a sample 1 was fabricated by the interconnector subassembly and the cell subassembly being stacked in an alternating manner. A fuel cell stack of a sample 1C was also fabricated in a similar manner, aside from the cell supporting member not being provided.

Next, power generation of each of the fabricated fuel cell stacks was performed. A hardening resin was subsequently injected into each stack and hardened.

Then, each fuel cell stack was cut to form a cross-section. The dimensions of the gas flow paths in the cell stacking direction on the anode side were measured. Flow-path dimensional variations were determined. Here, the spacing between interconnectors are set such as to be fixed. Therefore, if the flow-path dimensional variations on the anode side is small, the flow-path dimensional variations on the cathode side are also small.

As a result of the foregoing, the fuel cell stack of the sample 1C has a flow-path dimensional variation σ of 0.12, whereas the fuel cell stack of the sample 1 has a flow-path dimensional variation σ of 0.01. Therefore, it has been confirmed that, through use of the above-described configuration, a fuel cell stack that is capable of suppressing dimensional variations in the gas flow paths can be obtained.

The present disclosure is not limited to the above-described embodiments and experimental example. Various modifications are possible without departing from the spirit of the present disclosure. In addition, the configurations according to the embodiments and described in the experimental example may be arbitrarily combined.

For example, the configurations according to the first to sixth embodiments may each be modified such that the cell supporting member 5 is disposed in the first gas flow path 3C on the cathode side and the pressing member 4 is disposed in the second gas flow path 3A on the anode side. In addition, for example, according to the first embodiment, the cell supporting member 5 may be configured as a part of the interconnector 6. Furthermore, for example, according to the second embodiment, the cell supporting member 5 may be configured as a member that is separate from the interconnector 6. According to the first, third, and fourth embodiments, a configuration in which the cell supporting member 5 is not joined to the interconnector is possible.

What is claimed is:

1. A fuel cell stack comprising:
   a fuel cell;
   a first gas flow path that is provided on a first cell surface side of the fuel cell;
   a second gas flow path that is provided on a second cell surface side of the fuel cell;
   a pressing member that is disposed in the first gas flow path, and presses the first cell surface of the fuel cell; and
   a cell supporting member that is disposed in the second gas flow path, and supports the second cell surface, of the fuel cell that is pressed by the pressing member, wherein the cell supporting member has a contact surface that extends for an entirety of the cell supporting member in both first and second directions that are perpendicular to a stacking direction in which the fuel cell, the pressing member, and the cell supporting member are stacked on each other,
   the contact surface directly abuts on the second cell surface of the fuel cell,
   the contact surface extends entirely parallel to the second cell surface of the fuel cell in both the first and second directions to support the second cell surface of the fuel cell, and
   the fuel cell stack is configured to satisfy a relationship in which a rigidity of the fuel cell is less than a rigidity of the pressing member, and the rigidity of the pressing member is less than a rigidity of the cell supporting member.

2. The fuel cell stack according to claim 1, wherein:
   the cell supporting member supports at least a center portion in the second cell surface of the fuel cell.

3. The fuel cell stack according to claim 1, wherein:
   the pressing member is an elastic member that presses the first cell surface of the fuel cell with elastic force.

4. The fuel cell stack according to claim 1, wherein:
   the cell supporting member includes a metal material.

5. The fuel cell stack according to claim 4, wherein:
   the fuel cell stack has an assembled structure in which a plurality of the fuel cells and a plurality of interconnectors are arranged in an alternating manner; and
   the cell supporting member includes a member that is separate from a first interconnector of the plurality of interconnectors.

6. The fuel cell stack according to claim 4, wherein:
   the fuel cell stack has an assembled structure in which a plurality of the fuel cells and a plurality of interconnectors are arranged in an alternating manner; and
   the cell supporting member is a portion of a first interconnector of the plurality of interconnectors.

7. The fuel cell stack according to claim 1, wherein:
   the cell supporting member includes a ceramic material.

8. The fuel cell stack according to claim 1, wherein:
   the pressing member has electrical conductivity.

9. The fuel cell stack according to claim 1, wherein:
   the fuel cell has a flat plate-shaped battery structure that includes a pair of cell surfaces;
   the first cell surface is one of the pair of cell surfaces; and
   the second cell surface is the other of the pair of cell surfaces.

10. The fuel cell stack according to claim 9, wherein:
    the cell supporting member includes a plurality of linear portions that are separated from each other, the cell supporting member supporting an overall surface of the second cell surface.

11. The fuel cell stack according to claim 9, wherein:
    the cell supporting member includes a planar member having a plurality of through holes that communicate to the second gas flow path, the cell supporting member supporting an overall surface of the second cell surface.

12. The fuel cell stack according to claim 1, wherein:
    the fuel cell has a battery structure of a circular cylinder;
    the first cell surface is an outer peripheral surface of the cylinder;
    the second cell surface is an inner peripheral surface of the cylinder;
    the first gas flow path is disposed in an exterior of the cylinder; and
    the second gas flow path is disposed in an interior of the cylinder.

13. The fuel cell stack according to claim 1, wherein:
    the second cell surface of the fuel cell is formed into a planar shape; and
    a shape of the contact surface of the cell supporting member is formed into a planar shape along the planar shape of the second cell surface of the fuel cell.

14. A fuel cell stack comprising:
    a plurality of fuel cells including a first fuel cell;
    a first gas flow path that is provided on a first cell surface side of the first fuel cell;
    a second gas flow path that is provided on a second cell surface side of the first fuel cell;
    a pressing member that is disposed in the first gas flow path, and presses the first cell surface of the first fuel cell; and
    a cell supporting member that is disposed in the second gas flow path, and supports the second cell surface, of the first fuel cell that is pressed by the pressing member, wherein the fuel cell stack has an assembled structure in which the plurality of fuel cells and a plurality of interconnectors including a first interconnector are arranged in an alternating manner, and the cell supporting member has a contact surface that extends for an entirety of the cell supporting member in both first and second directions that are perpendicular to a stacking direction in which the first fuel cell, the pressing member, and the cell supporting member are stacked on each other, the contact surface extends entirely parallel to at least one of the second cell surface of the first fuel cell and the first interconnector in both the first and second directions to support the second cell surface of the first fuel cell, and the fuel cell stack is configured to satisfy a relationship in which a rigidity of the first fuel cell is less than a rigidity of the pressing member, and the rigidity of the pressing member is less than a rigidity of the cell supporting member.

15. A fuel cell stack comprising:

a plurality of fuel cells including a first fuel cell;

a first gas flow path that is provided on a first cell surface side of the first fuel cell;

a second gas flow path that is provided on a second cell surface side of the first fuel cell;

a pressing member that is disposed in the first gas flow path, and presses the first cell surface of the first fuel cell; and a cell supporting member that is disposed in the second gas flow path, and supports the second cell surface, of the first fuel cell that is pressed by the pressing member, wherein the fuel cell stack has an assembled structure in which the plurality of fuel cells and a plurality of interconnectors including a first interconnector are arranged in an alternating manner, the cell supporting member has a first contact surface that directly abuts on the second cell surface of the first fuel cell, and a second contact surface that directly abuts on the first interconnector, and the fuel cell stack is configured to satisfy a relationship in which a rigidity of the first fuel cell is less than a rigidity of the pressing member, and the rigidity of the pressing member is less than a rigidity of the cell supporting member.

\* \* \* \* \*